(No Model.)
F. B. COVEL.
CENTERING TOOL.
No. 521,206. Patented June 12, 1894.
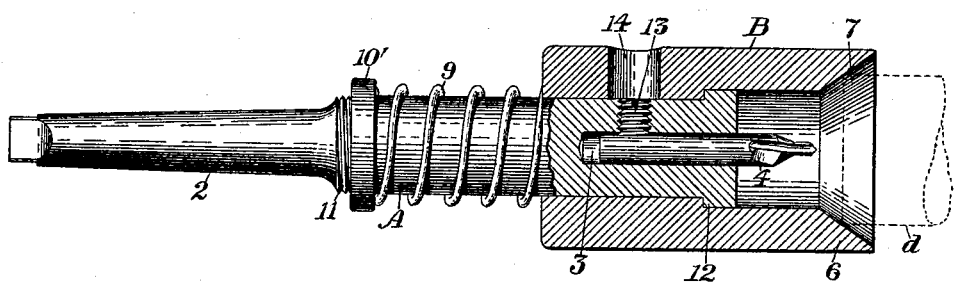
Witnesses:
John L. Edwards Jr.
N. C. C. Whitney
Inventor:
Frank B. Covel.
By his Attorney,
F. A. Richards

UNITED STATES PATENT OFFICE.

FRANK B. COVEL, OF HARTFORD, CONNECTICUT, ASSIGNOR TO THE DWIGHT SLATE MACHINE COMPANY, OF SAME PLACE.

CENTERING-TOOL.

SPECIFICATION forming part of Letters Patent No. 521,206, dated June 12, 1894.

Application filed September 5, 1893. Serial No. 484,811. (No model.)

*To all whom it may concern:*

Be it known that I, FRANK B. COVEL, a citizen of the United States, residing at Hartford, in the county of Hartford and State of Connecticut, have invented certain new and useful Improvements in Centering-Tools, of which the following is a specification.

This invention relates to that class of centering-tools which are used for drilling "centers" in ends of shafts, for preparing these to be held on the centers of a lathe during the operation of turning the same.

The object of my present invention is to provide a centering-tool adapted for carrying a drill, or combined drill and reamer, for making the center, and having means for supporting and automatically centering the end of the shaft to be drilled.

In the drawing accompanying and forming a part of this specification, I have shown a side view, partially in central longitudinal section, of a centering-tool, embodying my invention.

The body of the spindle A of the centering-tool is shown furnished with a shank, 2, whereby the same may be held in the spindle of a drilling-machine. Instead of said shank, the spindle A may be provided with other well-known and suitable means (not herein shown) for holding the same in the lathe or drilling-machine.

At its forward end the tool-spindle has a bore, 3, in which is fitted a center-drilling tool, 4, this being held in place by means of a set-screw, 13, as shown in the drawing. Upon the spindle A at the forward end thereof is carried a sliding guide-sleeve, B, the forward end, 6, is bored with a conical recess to form a centering-cup, 7, for receiving and holding centrally with relation to the axis of the center-drilling tool, the shaft or like piece to be center-drilled, this piece being indicated by dotted lines, $d$, in the drawing. In the side of said sleeve B is an opening, 14, through which the tool-holding screw 13 is accessible for loosening and tightening the same when it is required to remove or replace the tool. An ordinary spiral spring, 9, is shown carried upon the tool-spindle A rearward of said sleeve B and forward of a spring-abutment or collar, 10', with which the tool-spindle A is provided. This spring acts to force forward the sleeve B so that considerable pressure may be brought to bear upon the piece $d$ being centered, to force this into the cup of said sleeve when the sleeve is forced backward on the spindle to permit the drilling-tool to operate upon said piece $d$. Said spring is therefore designated as a resistance spring. In the preferred form of tool shown in the drawing, the spring-abutment 10' is shown removable and adjustable upon said spindle, it being screwed firmly upon a thread, 11, formed on said spindle. This spindle has at its forward end the stop-flange, 12, which abuts against a shoulder of the sleeve B and limits the forward movement thereof.

By providing the spindle A with a separate removable collar or abutment 10' as illustrated in the drawing, two important advantages are secured, viz:—the tension of the spring may be regulated by a longitudinal adjustment of the collar upon the spindle and the spring may also be quickly removed and replaced if desired by simply removing the collar without disturbing the other elements of the implement.

In the implement shown in the drawing, the drilling-tool 4 is held in place by means of a screw 13, the outer face of which lies within the circumferential line of the spindle, access to the screw being obtained through the hole 14 in the sleeve B. By this construction the guide-sleeve B may have both a sliding and a rotary movement upon the spindle A of the implement. This is for the purpose of avoiding friction between the cup-face of the sleeve and the end of the piece $d$ being center-drilled, which would occur if the sleeve B rotated with the spindle A.

One peculiar and important feature of this invention is the formation of the centering-cup 7 and the sleeve B in a single piece, which permits the cup and the sleeve to be concentrically bored with the greatest accuracy and secures the best practical results, as there are no separate pieces to "fit up," or to become loosened or disarranged by continued usage.

It will be observed by reference to the drawing, that the center-drilling tool has a long bearing in the spindle and projects but a short distance beyond the end thereof, which organization precludes any possibility of the "springing" and consequent disalignment thereof during the drilling operation; also it will be seen that the spindle bearing or internal bore of the sleeve is of a diameter approximately equal to, or fractionally greater than the diameter of the spindle from end to end, and that it diverges at its forward end in conical lines to form a centering-cup. This construction permits the sleeve to be forced backward if desired until the end of the spindle is flush, or approximately so, with the extreme forward end of the centering-cup, and owing to the long bearing of the spindle, any lateral movement thereof with relation to the sleeve and centering cup is entirely obviated.

By the construction and organization of the parts of the centering-tool as hereinbefore described, I am enabled to remove and replace the center-drilling tool 4 without removing the spindle from the sleeve B, thus permitting a quick interchange of tools in case one should become broken.

Having thus described my invention, I claim—

1. The combination in a centering tool, of a conically-bored centering-cup having a longitudinally bored axial extension formed integral therewith, which extension forms a guiding sleeve for a spindle, a spindle fitted to slide in said sleeve, and having a collar or abutment at its forward end, a stop for said sleeve, a spiral-spring surrounding the spindle, outside of said sleeve, and bearing against the extreme rear end of said sleeve and against the collar on the spindle, and a tool removably fixed in the forward end of the spindle, substantially as and for the purpose set forth.

2. The improved centering-tool herein described, comprising a conically-bored centering-cup having a longitudinally and concentrically bored extension, or sleeve, formed integral therewith, the smallest diameter of which conical bore of the centering-cup coincides with the greatest diameter of the longitudinal bore of the sleeve, a stop for said sleeve, a spindle closely fitting the bore of the sleeve and having a collar or abutment at its forward end, and capable of being moved to the extreme forward end of the centering-cup, a collar or abutment removably and adjustably secured to the rearwardly projecting end of said spindle, a drilling-tool removably fixed in the forward end of said spindle, a tool-fastening screw extended through said spindle and bearing against said tool with its outer end within the circumferential line of the spindle, and a resistance spring interposed between the collar of the spindle and the extreme rear end of the sleeve, substantially as and for the purpose described.

FRANK B. COVEL.

Witnesses:
FRANCIS H. RICHARDS,
HOWARD N. HINCKLEY.